(No Model.) 3 Sheets—Sheet 1.

W. F. RICHARDS.
CAR BRAKE MECHANISM.

No. 460,162. Patented Sept. 29, 1891.

WITNESSES:

INVENTOR
W. F. Richards
BY Hall & Fay
his ATTORNEYS.

(No Model.) 3 Sheets—Sheet 2.

W. F. RICHARDS.
CAR BRAKE MECHANISM.

No. 460,162. Patented Sept. 29, 1891.

WITNESSES:
Wm Lecher
N. H. Fay

INVENTOR
W. F. Richards
BY Hall & Fay
his ATTORNEYS.

(No Model.) 3 Sheets—Sheet 3.
W. F. RICHARDS.
CAR BRAKE MECHANISM.
No. 460,162. Patented Sept. 29, 1891.
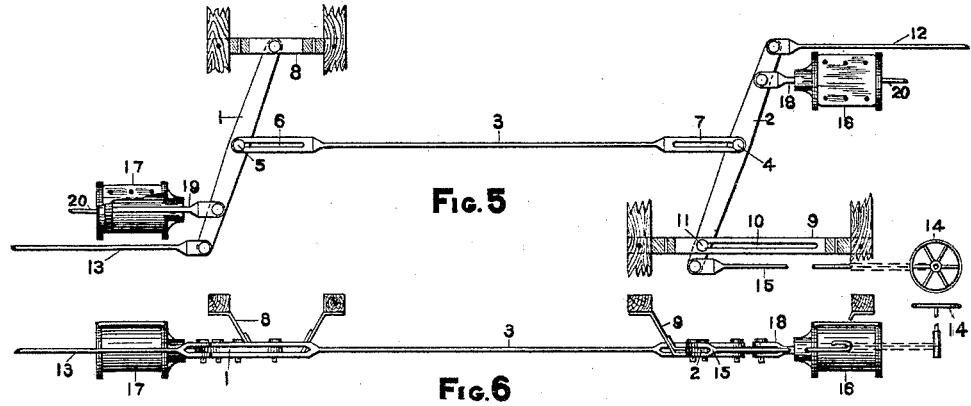
Fig. 5
Fig. 6
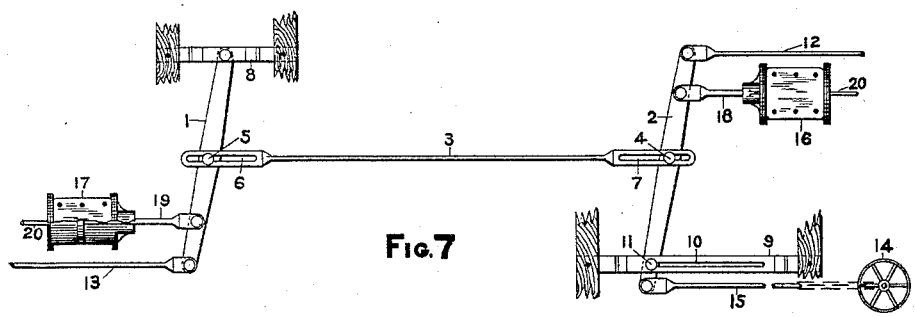
Fig. 7
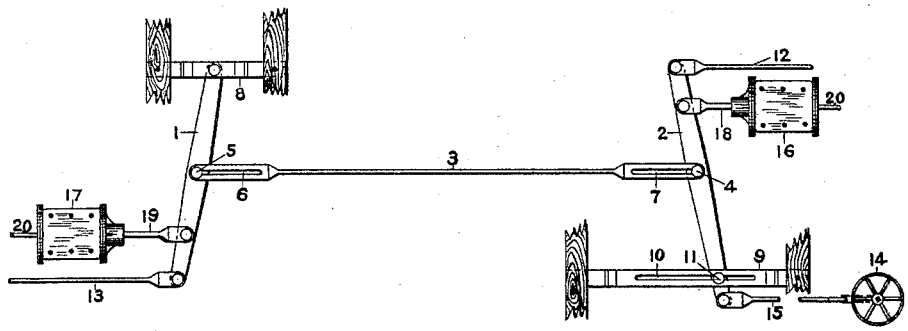
Fig. 8
WITNESSES:
INVENTOR
W. F. Richards,
BY Hall & Fay
ATTORNEY.

UNITED STATES PATENT OFFICE.

WILLARD F. RICHARDS, OF PITTSBURG, PENNSYLVANIA.

CAR-BRAKE MECHANISM.

SPECIFICATION forming part of Letters Patent No. 460,162, dated September 29, 1891.

Application filed November 28, 1890. Serial No. 372,766. (No model.)

*To all whom it may concern:*

Be it known that I, WILLARD F. RICHARDS, a citizen of the United States, and a resident of Pittsburg, county of Allegheny, and State of Pennsylvania, have invented certain new and useful Improvements in Car-Brake Mechanism, of which the following is a specification, the principle of the invention being herein explained and the best mode in which I have contemplated applying that principle so as to distinguish it from other inventions.

My invention relates especially to brake-operating mechanisms for railway-cars, having means for governing the power of the brake-actuating means, according to the load upon the trucks.

The objects of my invention are to provide an improved arrangement of brake-actuating air or other fluid-cylinders to independently operate the brakes of each truck; to provide improved means for independently operating the brakes of each truck of a railway-car by fluid-pressure and for jointly operating the brakes of both trucks by hand-power from one end of the car, and to provide improved means for independently operating the brakes of each truck by fluid-pressure, and for jointly operating the brakes of both trucks by hand-power from both ends of the car.

Figure 1:
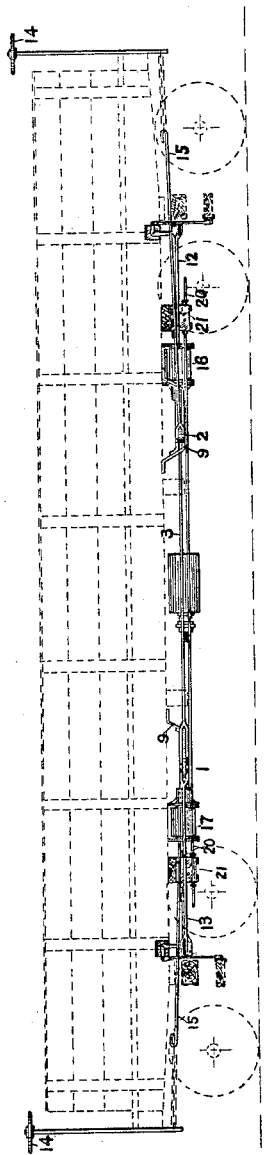
Figure 2:
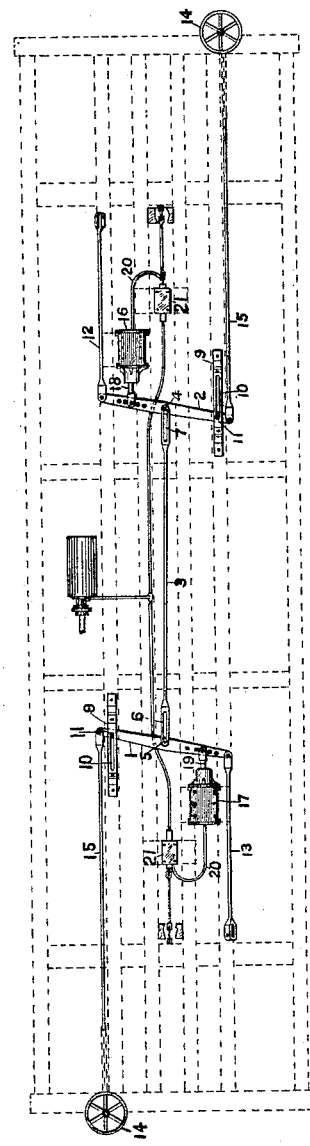
Figure 3:
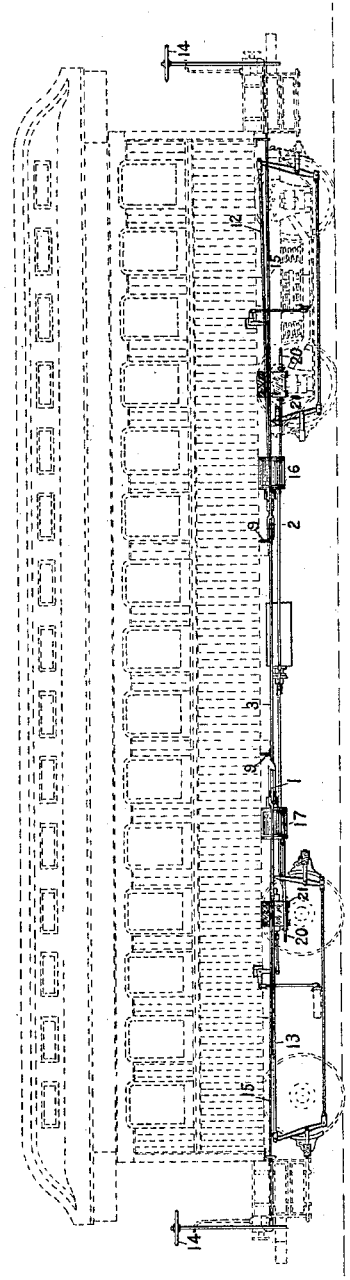
Figure 4:
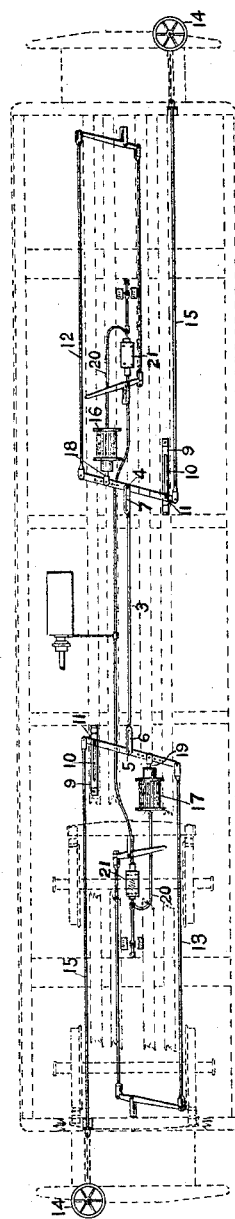

Referring to the drawings, Figure 1 represents a side elevation of a gondola-car provided with my improved brake mechanism; Fig. 2, a bottom plan view of the same; Fig. 3, a side elevation of a passenger-car provided with the brake mechanism; Fig. 4, a bottom plan view of the same; Fig. 5, a plan view of the lever mechanism, showing the mechanism in position with the brakes "off;" Fig. 6, a side view of the same; Fig. 7, a plan view of the mechanism, showing the levers and cylinders in the act of applying the brakes by fluid-pressure; and Fig. 8, a plan view of the brake mechanism, showing the levers operated by the hand-wheel to apply the brakes.

In said drawings, the numerals 1 and 2 indicate the brake-levers, which are connected at their middles by a rod 3, the forked ends of which straddle said levers and slide with longitudinal slots 6 and 7 upon studs or pins 4 and 5 upon said levers. The lever 1 has a stationary fulcrum 8, rigidly secured to the car, and the lever 2 has its fulcrum upon a stud or pin 11, which slides in a longitudinal slot 10 in a bar or bracket 9, secured to the car. The rods 12 and 13 are pivotally connected to the extreme ends of the levers 2 and 1, and have their other ends suitably connected to the truck-levers, which operate the brake-beams of the two trucks. The piston-rods 18 and 19 of the individual air-cylinders 16 and 17 are pivotally connected to the brake-levers 2 and 1, near the ends to which the brake-rods 12 and 13 are pivoted, and said cylinders have the usual air-pipes 20 connected to them. Said air-pipes have preferably graduating or regulating devices 21 connected to them, by means of which the admission or exhaust of the air or other brake-operating medium is controlled and governed according to the load bearing upon each truck.

As the detail construction of these devices forms no part of this present invention, but is simply claimed in combination with the operating mechanism, and may either be the devices for which I have filed an application for Letters Patent on the 24th day of April, 1890, under Serial No. 349,228, allowed August 2, 1890, or any equivalent devices for the same purpose, I have deemed it unnecessary to illustrate said devices in detail.

A rod 15, terminating in a chain and operated by a suitable brake-stand 14 for manipulation by hand-power, is pivotally connected to the end of the brake-lever 2 beyond its sliding fulcrum 11, and when it is desired to operate the brakes by hand from either end of the car, a similar rod is pivoted to the opposite end of the other lever, which in that case has a sliding fulcrum instead of a stationary fulcrum.

In practice, when the brakes are applied by means of the air-cylinders and their pistons, the brake-levers will be forced toward each other and the longitudinal slots in the ends of the rod 3 will admit of said levers being moved toward each other without bending or buckling of the rod. Said rod 3 may be substituted by a chain or by a rod having a sliding joint, or of any suitable construction that will allow the rod to form a non-extensible but contractible coupling between the levers. When the brakes are operated by hand, the lever 2 may be tilted by the brake-stand and its fulcrum 11 may slide in the slotted bracket 9. This will cause said lever to draw upon the coupling-rod 3 and to tilt the lever 1, so that both sets of brakes will be simultaneously applied with the same force exerted against the wheels of both trucks. The coupling rod 3 will thus admit of the brakes of both trucks being simultaneously applied with the same force when the mechanism is operated by hand, and of the brakes of either one or of both trucks being applied by fluid-pressure with varying force, according to the load upon each truck. This feature would be impossible to carry out with one single air-cylinder, and would also be impossible to carry out with the usual system of brake-levers without the contractible but non-extensible coupling between said levers, as said levers could not be tilted toward each other without said contractible coupling. As the coupling-rod is attached to the middles of the two brake-levers, the brakes of both trucks will be applied with equal force when the brakes are operated by hand.

The foregoing description and accompanying drawings set forth in detail mechanism embodying my invention. Change may be made therein, provided the principles of construction respectively recited in the following claims are employed.

I therefore particularly point out and distinctly claim as my invention—

1. In a railway-car brake mechanism, the combination, with individual brake-levers and brakes for the trucks, of individual fluid-cylinders connected to operate said levers and brakes, a non-extensible but contractible coupling between said levers, and hand-power brake-operating mechanisms connected to said brake-levers, substantially as set forth.

2. In a railway-car brake mechanism, the combination, with individual brake-levers and brakes for the trucks, of individual fluid-cylinders connected to operate said levers and brakes, fluid-regulating devices for said cylinders for graduating the braking-power of each cylinder in proportion to the load upon the truck, a non-extensible but contractible coupling between said levers, and hand-power brake-operating mechanisms connected to said brake-levers, substantially as set forth.

3. In a railway-car brake mechanism, the combination of two brake-levers, a stationary fulcrum for one lever and a longitudinally-sliding fulcrum for the other lever, fluid-cylinders connected to operate said levers, a non-extensible but contractible coupling between said levers, and a brake-rod and chain attached to one lever near its sliding fulcrum, substantially as set forth.

4. In a railway-car brake mechanism, the combination of two brake-levers, one having a stationary fulcrum at one end and the other having a sliding fulcrum at one end, means for individually rocking said levers, a non-extensible but contractible coupling between said levers, and a hand-operated brake-rod attached to the sliding end of the one lever, substantially as set forth.

5. In a railway-car brake mechanism, the combination of two hand-operated brake-levers, a non-extensible but contractible coupling between said levers, and individual operating mechanism connected to each lever, substantially as set forth.

6. In a railway-car brake mechanism, the combination of two brake-levers, a stationary fulcrum for the end of one lever, a longitudinally-slotted bracket forming a sliding fulcrum for the end of the other lever, fluid-cylinders having their piston-rods connected to said levers, brake-operating rods pivoted to the free ends of said levers, a rod having its longitudinally-slotted ends pivotally connected to the middles of said levers, and a brake-rod, chain, and hand-wheel attached to the sliding end of the one lever, substantially as set forth.

In testimony that I claim the foregoing to be my invention I have hereunto set my hand this 22d day of November, A. D. 1890.

WILLARD F. RICHARDS.

Witnesses:
 EDWD. B. CLARK,
 S. H. LLOYD.